United States Patent [19]
Colletti

[11] Patent Number: 6,112,863
[45] Date of Patent: Sep. 5, 2000

[54] BAND BRAKE WITH EVENLY DISTRIBUTED BRAKING FORCE APPLICATION

[76] Inventor: Gregory J. Colletti, 468 Buckhorn Dr., Belvidere, N.J. 07823

[21] Appl. No.: 09/215,205

[22] Filed: Dec. 18, 1998

[51] Int. Cl.⁷ .................................................... F16D 51/00
[52] U.S. Cl. ........................ 188/77 R; 188/78; 188/82.6; 188/77 W; 192/17 R
[58] Field of Search .............................. 188/174 R, 82.6, 188/77 W, 78, 82.8, 77 R, 82.4, 82.5, 82.84, 82.77; 192/17 R, 72

[56] References Cited

U.S. PATENT DOCUMENTS

| | | |
|---|---|---|
| 1,983,834 | 12/1934 | Barnes . |
| 2,582,487 | 1/1952 | Kelbel . |
| 2,599,559 | 6/1952 | Kelbel . |
| 2,910,893 | 11/1959 | Peras . |
| 3,447,650 | 6/1969 | Dossier . |
| 4,311,221 | 1/1982 | Ratner ...................... 188/259 |
| 4,416,107 | 11/1983 | Hoff ................. 188/174 R X |
| 5,122,099 | 6/1992 | Boedo et al. ............................. 475/187 |
| 5,445,246 | 8/1995 | Haka et al. ................................ 188/77 |
| 5,711,403 | 1/1998 | Sparks et al. ......................... 188/77 W |

FOREIGN PATENT DOCUMENTS

| | | |
|---|---|---|
| 925 489 | 3/1955 | Germany . |
| 2 339 253 | 2/1974 | Germany . |
| 487 591 | 12/1953 | Italy . |
| WO 86/07423 | 12/1986 | WIPO . |

*Primary Examiner*—Khoi Q. Ta
*Attorney, Agent, or Firm*—Richard C. Litman

[57] ABSTRACT

A band brake for selectively holding a rotating element motionless includes means for evenly distributed application of force to the band brake. In some embodiments of the invention ball or roller bearings are used to apply evenly distributed forces to the band brake. In other embodiments of the invention, the band brake has variable thickness and the thicker portions are wedged between a rotating member and some outer member to hold the rotating member motionless. In at least one embodiment, selectively movable pairs of mirror-image ball or roller bearings are used to apply braking force directly to a rotating element.

11 Claims, 7 Drawing Sheets

BAND BRAKE WITH EVENLY DISTRIBUTED BRAKING FORCE APPLICATION

BACKGROUND OF THE INVENTION

1. Field of the Invention

The present invention relates to a band brake with evenly distributed braking force application and a transmission using such a band brake. In at least one embodiment, evenly distributed braking force is applied directly to a rotating element.

2. Background and Description of the Related Art

Epicyclic gear sets including a sun gear, planet or pinion gears, a planetary carrier, and a ring gear, are commonly used in automatic automotive transmissions. Automotive automatic transmissions generally contain several epicyclic gear sets. Gear ratio selection involves holding some elements of the epicyclic gear sets motionless while allowing the other elements of the epicyclic gear sets to rotate relative to the transmission case or housing. The elements of the epicyclic gear sets are selectively held motionless by the use of band brakes. These band brakes usually frictionally engage the ring gear directly, or the sun gear and the planetary carrier through a driving shell fixedly attached to the particular element, and hold the particular element of the epicyclic gear set motionless when drawn tightly around either the ring gear itself or a driving shell in the case of the sun gear and the planetary carrier. Each band brake is usually dedicated to the control of a respective element of a particular epicyclic gear set. The gear selection mechanism determines which band brakes are engaged and which band brakes are disengaged at any given time.

Each band brake is engaged by an actuating mechanism which draws the ends of the band brake together to thereby tightly draw the band brake around its respective ring gear or driving shell. The frictional force applied by the band brake is directly related to the force applied between the ends of the band brake by the actuating mechanism. This arrangement puts a great demand upon the actuating mechanism to supply sufficient braking force to hold the ring gear or driving shell motionless.

Depending upon the load under which the transmission is operating, the actuating mechanism may not be capable of providing adequate braking force. Further, conventional actuating mechanisms are prone to wear and failure. In addition, it would also be desirable to reduce the bulk of the conventional actuating mechanisms as much as possible. Therefore the need persists in the art for a means to amplify the force applied to a band brake by the band brake actuating mechanism. Also, it would be desirable to evenly distribute the braking force applied by the band brake so as to avoid lateral loads, i.e. loads directed transversely to the axis of rotation, which can damage the bearings supporting various rotating parts.

Overrunning clutches, one-way clutches, and torque limiters that apply a braking force to a rotating element are known in the art, but none are seen to involve the evenly distributed application of force to a band brake. The following are some examples of overrunning clutches, roller clutches, and torque limiters that have been proposed in the art.

U.S. Pat. No. 5,740,893, issued to Ken Yamamoto on Apr. 21, 1998, shows a one-way clutch which uses ball bearings to frictionally immobilize the inner bearing race when torque is applied in a first direction, while allowing free rotation of the inner bearing race when torque is applied in a second opposite direction. A split ring which fits into a groove in the outer bearing race carries the cam surfaces which wedge the ball bearings into frictional engagement with the inner race.

U.S. Pat. No. 5,706,700, issued to Yoshito Takagi et al. on Jan. 13, 1998, shows an overrunning clutch for starter motors. The clutch of Takagi et al. uses spring-biased rollers to immobilize the internally toothed ring gear of a planetary gear set when torque is applied to the ring gear in one direction, while allowing the ring gear to rotate freely when torque is being applied in the opposite direction.

U.S. Pat. No. 5,672,110, issued to Masahiro Kurita et al. on Sep. 30, 1997, shows a torque limiter that allows a driving shaft to disengage from a driven element when the torque load on the driven element exceeds a safe limit. The torque limiter of Kurita et al. uses a set of rollers that provide the frictional engagement between the driving shaft and the driven member. The rollers bear against an octagonal surface in the driven member and move into the corner recesses of the octagonal bearing surface if the load on the driven member exceeds a predetermined threshold.

U.S. Pat. No. 5,520,268, issued to Wenhua Li et al. on May 28, 1996, shows an overrunning clutch which uses a chain of triangular wedges to frictionally engage a shaft coupling when torque is applied in a first direction, while allowing free rotation of the shaft coupling when torque is applied in a second opposite direction.

U.S. Pat. No. 5,152,726, issued to Frederick E. Lederman on Oct. 6, 1992, shows a shiftable roller clutch that can replace the disk pack clutch in an automatic transmission. The rollers in the Lederman device are spring-biased and are held in a cage. The cage is shiftable relative to an outer bearing surface. With the cage in a first position, an inner rotating element can freewheel in both directions. With the cage in a second position, the inner rotating element can freewheel in one direction only in the same manner as an overrunning clutch.

U.S. Pat. No. 4,415,072, issued to Masao Shoji et al. on Nov. 15, 1983, shows a one-way clutch that uses spring-biased rollers between an inner and an outer race to prevent relative rotation between the inner and outer races in one direction while allowing relative rotation between the inner and outer races in the opposite direction.

U.S. Pat. No. 3,732,959, issued to Ernest U. Lang et al. on May 15, 1973, shows an overrunning clutch that uses a plurality of overlapping and interfitting clutch bands which engage a V-groove in an inner rotating member. The clutch bands are each individually anchored to an outer rotating member. Rotation of the inner member, relative to the outer member, in a first direction urges the clutch bands into frictional engagement with the V-groove, and the clutch bands are disengaged from the V-groove when the inner member is rotated, relative to the outer member, in a second direction which is opposite to the first direction.

U.S. Pat. No. 3,447,650, issued to Michel Dossier et al. on Jun. 3, 1969, shows a one-way friction coupling that uses brake shoes provided intermediate a rotating shaft and a sleeve. The shoes are cammed into frictional engagement with the sleeve when the shaft is rotated in a first direction relative to the sleeve, and the shoes are disengaged from the sleeve when the shaft is rotated, relative to the sleeve, in a second direction which is opposite to the first direction.

German Patent Number 925,489, issued to Aloys Zeppenfeld on Mar. 24, 1955, shows an overrunning clutch surrounded by a ring which is in frictional engagement with a brake band. With the brake band engaged, a shaft on which the overrunning clutch is mounted can rotate in only one direction. With the brake band disengaged, the shaft can rotate in both the clockwise and counter clockwise directions.

Italian Published Patent Application Number 487,591, by Terenzio Scalarini et al., dated Dec. 3, 1953, shows a selectively engageable roller clutch. When engaged, the roller clutch permits rotation in one direction only.

Soviet Inventors Certificate Number 1,810,662, dated Apr. 23, 1993, shows a roller clutch that allows rotation in one direction only.

None of the above inventions and patents, taken either singularly or in combination, is seen to describe the instant invention as claimed. In particular none of the above documents teach or suggest the evenly distributed application of force to a band brake.

SUMMARY OF THE INVENTION

The present invention relates to a band brake for selectively holding a rotating element, for example a component of an epicyclic gear set, motionless. Provision is made for the evenly distributed application of force to the band brake. In some embodiments of the invention ball or roller bearings are used to apply evenly distributed forces to the band brake. In other embodiments of the invention, the band brake has variable thickness and the thicker portions are wedged between a rotating member and some outer member to hold the rotating member motionless. Further, in some embodiments of the invention the means used for evenly distributed application of force to the band brake act to amplify the force applied by the mechanism that actuates the band brake. In yet another embodiment, braking force is applied directly to a rotating element.

Another aspect of the present invention is a hybrid transmission which incorporates any one of the mechanisms for applying evenly distributed braking force to a rotating element in accordance with the present invention.

Accordingly, it is a principal object of the invention to provide a band brake for selectively holding a rotating member motionless.

It is another object of the invention to provide a means for the evenly distributed application of force to a band brake or directly to a rotating element.

It is a further object of the invention to use ball or roller bearings to selectively apply evenly distributed forces to a band brake or directly to a rotating element.

Still another object of the invention is to use a band brake having variable thickness to apply evenly distributed forces to the band brake.

Yet another object of the invention is to provide means for amplifying the force applied by the mechanism that actuates a band brake.

Still another object of the invention is to provide a hybrid transmission which incorporates any one of the mechanisms for applying evenly distributed braking force to a rotating element in accordance with the present invention.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
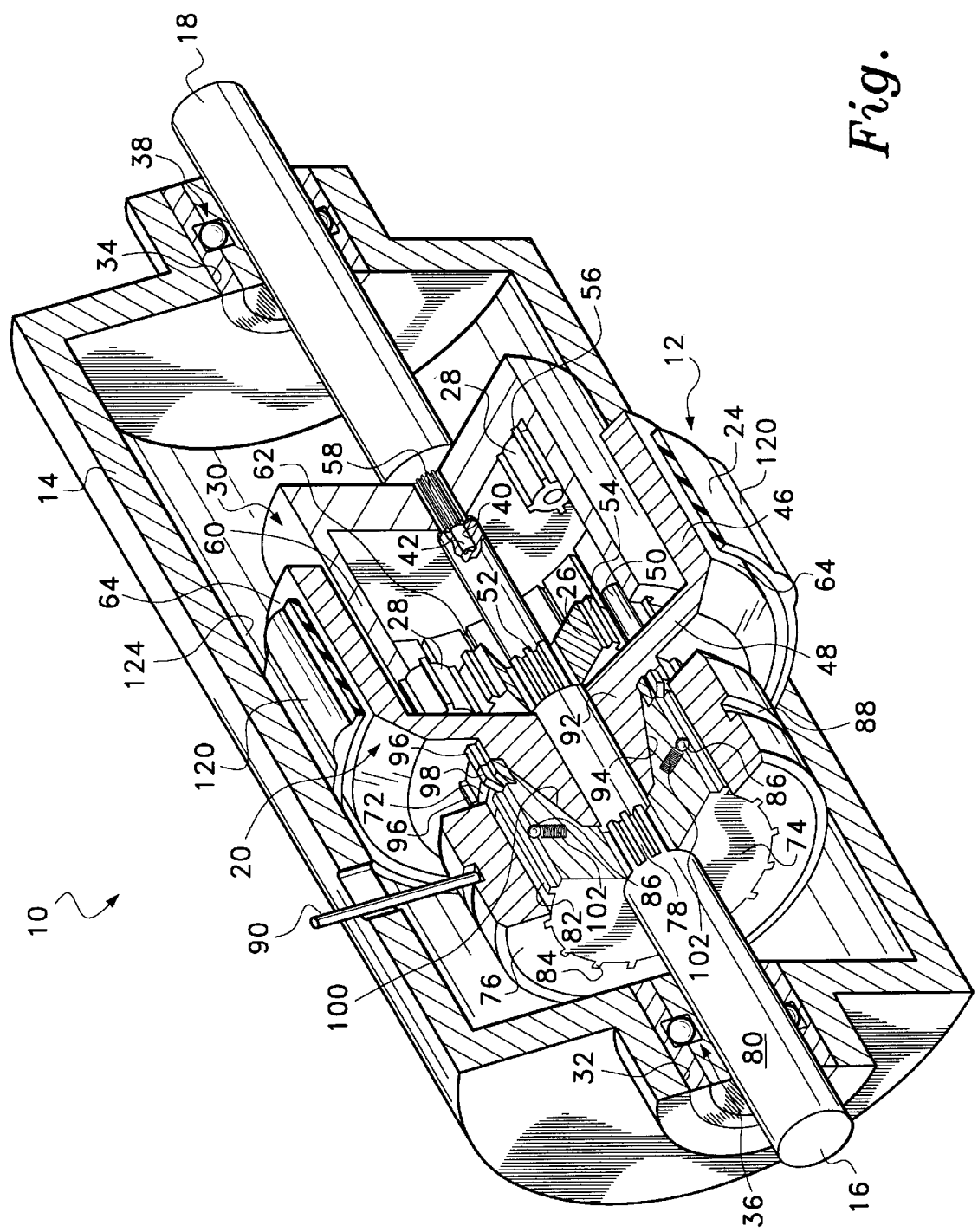
FIG. 1 is a cutaway perspective view showing a hybrid transmission using a band brake with evenly distributed force application made according to the present invention.
Figure 2:
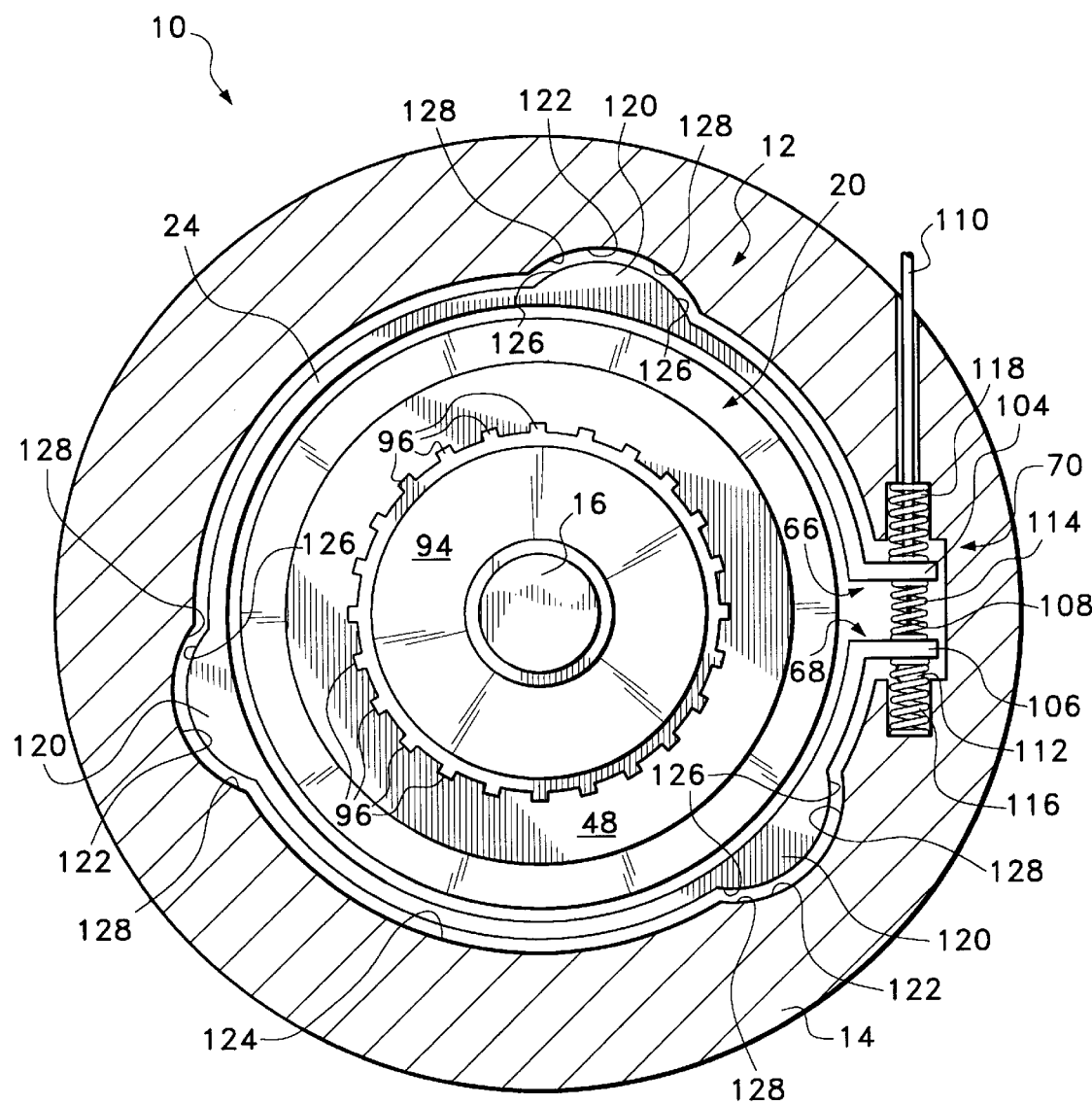
FIG. 2 is a cross sectional view of a hybrid transmission using a band brake with lugs projecting from the outer surface thereof according to the present invention.

Referring to FIGS. 1 and 2, a hybrid transmission 10 having means 12 for applying more evenly distributed braking forces to a rotating element, made in accordance to the present invention, can be seen. The hybrid transmission 10 is one aspect of the present invention and also serves to illustrate the operation of the means 12 for applying more evenly distributed braking forces to a rotating element. However, it should be noted that all the various means for applying evenly distributed braking force to a rotating element disclosed herein are generally applicable to controlling the rotation of any rotary machine element.

Except for the addition of the means for applying more evenly distributed braking forces to a rotating element, the hybrid transmission 10 is identical to a hybrid transmission disclosed in U.S. patent application Ser. No. 08/946,565 which is incorporated herein by reference. U.S. patent application Ser. No. 08/946,565 provides a detailed account of the operation of hybrid transmissions such as hybrid transmission 10. In addition, U.S. patent application Ser. No. 08/946,565 discloses various other embodiments of the hybrid transmission all of which can incorporate any one of the means for applying more evenly distributed braking forces disclosed herein.

The hybrid transmission 10 includes a stationary support housing 14, an input shaft 16 driven by a power source, an output shaft 18, a planetary carrier 20, a brake band 24, a sun gear 26, at least one planetary gear 28, and a ring gear 30.

The input shaft 16 and output shaft 18 are axially aligned and rotatably mounted within the support housing 14. The support housing 14 has openings in its end walls, 32 and 34, to receive ball bearing assemblies, 36 and 38 respectively, for journalling the adjacent portions of the shafts 16 and 18. The input shaft 16 has a hole 40 on one end in which sits a pin section 42 on one end of output shaft 18. Hole 40 houses a bearing (not shown) which allows the input shaft 16 and the output shaft 18 to rotate independently of each other.

The hybrid transmission of the present invention includes a planetary carrier 20 having a bore 44 which is freely rotatable about the input shaft 16. Bore 44 contains a bearing (not shown) which allows the planetary carrier 20 to smoothly rotate about input shaft 16. The planetary carrier has a cylindrical or drum portion 46 which is attached at one end to an annular section 48. The annular section 48 has a plurality of holes (not shown) which each have a planetary gear pin 50 affixed therein. A plurality of planetary gears 28 are rotatably supported on the planetary gear pins 50 which are fixedly supported by the planetary carrier 20. One of the planetary gears 28 is shown in an exploded away from its normal position in order to reveal one of the planetary gear pins 50.

The input shaft 16 of the hybrid transmission has splines 52 which rotationally fix the sun gear 26 to the input shaft 16. Thus the input shaft 16 and the sun gear 26 rotate as a unit. The outer surface of the sun gear 26 has teeth 54 which mesh with the teeth 56 on the outer surface of the planetary gears 28.

Output shaft 18 has splines 58 which rotationally fix the ring gear 30 to the output shaft 18 such that the ring gear 30 and the output shaft 18 rotate as a unit. The ring gear 30 has a cylindrical section 60 that extends toward and encircles the sun gear 26. The inner surface of the cylindrical section 60 of the ring gear 30 has internal grooves 62 which mesh with the teeth 56 on the planetary gears 28.

The hybrid transmission 10 also includes a brake band 24 which is a split ring of flexible metal that substantially encircles the outer surface 64 of the planetary carrier 20. The brake band 24 has a first end 66 and a second end 68. The actuating mechanism 70 which is described in detail later, acts to selectively bring the first end 66 and the second end 68 together to thus frictionally engage the brake band 24 to the outer surface 64 of the planetary carrier 20. The actuating mechanism 70 is merely illustrative of an actuating mechanism suitable for frictionally engaging the brake band 24 to a rotary machine element such as the planetary carrier 20. It should be understood that any well known mechanism for bringing the ends of the brake band together, or any such mechanism disclosed in U.S. patent application Ser. No. 08/946,565 which was earlier incorporated herein by reference, can be used in conjunction with the means for applying more evenly distributed braking forces in those embodiments of the present invention which use a brake band. Frictional engagement of the brake band 24 to the planetary carrier 20 ultimately prevents the rotation of the planetary carrier 20 as will be explained later.

The hybrid transmission 10 further includes a synchromesh mechanism for selectively rotationally fixing the planetary carrier 20 to the input shaft 16. The synchromesh mechanism is well known and will not be described in detail herein. The synchromesh mechanism includes a synchronizing ring 72, a splined hub 74, and an engaging ring 76. The input shaft 16 has another splined portion 78. The splined portion 78 engages matching internal splines (not shown) in the central bore of the hub 74, such that the hub 74 is rotationally fixed to the input shaft 16 while being free to slidably move in a direction parallel to the axis of rotation of the input shaft 16. The range of the slidable movement of the hub 74 is however limited by the planetary carrier 20 on one side and by the large diameter portion 80 of the input shaft 16 on the other side. The hub 74 has external splines or teeth 82 that are in constant engagement with internal grooves 84 formed in the central bore of the engaging ring 76. Thus the input shaft 16, the hub 74, and the engaging ring 76 rotate together in unison.

The hub 74 has cavities that house spring biased ball bearings 86. The ball bearings 86 project into cavities (not shown) formed on the internal surface of the central bore of the engaging ring 76 and act as detents which prevent movement of the engaging ring 76 relative to the hub 74, in a direction parallel to the axis of rotation of the input shaft 16, unless a force above a certain threshold is applied to the engaging ring 76 directed in the direction parallel to the axis of rotation of the input shaft 16. The cavities formed in the central bore of the engaging ring 76 are shown in U.S. patent application Ser. No. 08/946,565 which was earlier incorporated herein by reference. The cavities formed in the central bore of the engaging ring 76 are not deep enough for the ball bearings 86 to project into the cavities formed in the central bore of the engaging ring 76 to such an extent so as to entirely prevent relative movement between the engaging ring 76 and the hub 74.

The engaging ring 76 has an annular groove 88 which is engaged by a shifting fork which is well known in the art and is schematically shown as the rod 90. The rod 90 allows an operator of the transmission 10 to selectively move the engaging ring into engagement with the planetary carrier 20 as will be described below. The mechanism for moving the engaging ring 76 can be of any well known type including hydraulic or pneumatic actuators.

The planetary carrier 20 has a conical portion 92 which presents a convex conical surface 94 to the hub 74. At the broad base of the conical portion 92 are teeth 96. Synchronizing ring 72 also has teeth 98 which are shaped, dimensioned, and spaced such that the teeth 98 can be exactly superimposed over the teeth 96 when viewed with the line of sight parallel to the axis of rotation of the input shaft 16. In addition, the teeth 82 are also shaped, dimensioned, and spaced such that the teeth 82 can be exactly superimposed over the teeth 98 and 96 when viewed with the line of sight parallel to the axis of rotation of the input shaft 16.

The rod 90 can be actuated while the input shaft 16 is rotating. The rod 90 acts to slidably move the engaging ring 76 between a neutral position and an engaged position where the engaging ring 76 rotationally fixes the planetary carrier 20 to the input shaft 16. With the engaging ring 76 initially in the neutral position shown in FIG. 1, moving the rod 90 toward the planetary carrier 20 causes both the engaging ring 76 and the hub 74 to move toward the planetary carrier 20. The engaging ring 76 and the hub 74 move together due to the action of the spring biased ball bearings 86. The engaging ring 76 and the hub 74 continue to move toward the planetary carrier 20 until the concave conical surface 100, formed in the hub 74, contacts and frictionally engages the convex conical surface 94 of the planetary carrier 20. Frictional engagement of the surfaces 100 and 94 causes the rotational speed of the planetary carrier 20 to increase until the rotational speed of the planetary carrier 20 is about equal to the rotational speed of the hub 74 and the engaging ring 76. At the same time the synchronizing ring 72 is frictionally engaged by the hub 74 and the planetary carrier 20 and brought up to the same rotational speed as the hub 74 and the planetary carrier 20. Thus, the synchronizing ring 72, the hub 74, the planetary carrier 20, and the engaging ring 76 will come to rotate at about the same speed.

As more force is applied to the rod 90 in a direction toward the planetary carrier 20, a point will be reached when the force due to springs 102, biasing ball bearings 86 into engagement with the engaging ring 76, will be overcome and the ball bearings 86 will be pushed into the cavities housing the springs 102, thus allowing the engaging ring 76 to continue to move toward the planetary carrier 20. With the synchronizing ring 72, the hub 74, the planetary carrier 20, and the engaging ring 76 rotating at about the same speed, the grooves 84 on the inner surface of the engaging ring 76 will engage with teeth 98 and 96 without clashing. The synchronizing ring 72 gives an intermediate semi-locked stage to prevent premature locking between the engaging ring 76 and the planetary carrier 20. Once in the engaged position, the grooves 84 will simultaneously engage the teeth 82, 98, and 96 such that the planetary carrier 20 is rotationally fixed to the input shaft 16. The planetary carrier 20 will then rotate in the same direction and at the same speed as the input shaft 16 until the engaging ring 76 is slid back into the original, i.e. neutral, position.

The particular synchromesh mechanism illustrated in FIG. 1 is intended as an illustrative example. Any well known synchromesh mechanism such as those used in manual automotive transmissions or any of the synchromesh mechanisms disclosed in U.S. patent application Ser. No. 08/946,565 can be substituted for that shown in FIG. 1 without departing from the spirit and scope of the present invention.

The transmission 10 has three operating modes, these being forward, reverse, and neutral. In the neutral mode the input and output shafts are disengaged from each other and the input shaft can rotate with the output shaft being held stationary. Operation in the forward mode is achieved when the engaging ring 76 rotationally fixes the planetary carrier 20 to the input shaft 16, while the brake band 24 is disengaged from the planetary carrier 20. Operation in the reverse mode is achieved when the engaging ring 76 is in the neutral or disengaged position and the brake band 24 is frictionally engaged to the planetary carrier 20.

In neutral mode the brake band 24 is not engaged to the planetary carrier 20 and the engaging ring 76 is in the neutral position. In this mode if the input shaft 16 is rotating in a clockwise direction, for example, the planetary carrier is free to freewheel. The sun gear 26 will also rotate with the input shaft 16 in a clockwise direction. If any resistance is applied to the output shaft 18, the sun gear 26 will cause the planetary gears 28 to rotate about their pins 50 in a counter clockwise direction. Counter clockwise rotation of the planetary gears 28 causes the planetary gears to travel or "walk" along the inner surface of the cylindrical section 60 having the internal grooves 62, in a clockwise direction relative to the ring gear 30. As the planetary gears 28 "walk" along the inner surface of the cylindrical section 60, the pins 50 will orbit the sun gear 26 in the clockwise direction causing the planetary carrier 20 to also rotate in the clockwise direction but at a slower speed than the input shaft 16. Therefore, if any resistance is applied to the output shaft 18 at all, the planetary gears 28 will simply orbit the sun gear 26 without imparting any significant torque to the output shaft 18.

In forward mode, the brake band 24 is disengaged from the planetary carrier 20 while the engaging ring 76 is in the engaged position rotationally fixing the planetary carrier 20 to the input shaft 16. Again considering the clockwise rotation of the input shaft 16 for illustrative purposes, in the forward mode the planetary carrier 20, the planetary gears 28, and the sun gear 26 will all rotate in the clockwise direction in unison. The planetary carrier 20 and the sun gear 26 being locked together, and the teeth 56 of the planetary gears 28 being in mesh with the teeth 54 of the sun gear 26, there will not be any relative movement between the sun gear 26 and the planetary gears 28. The teeth 56 of the planetary gears 28, it should readily be apparent that the ring gear 30 and the output shaft 18 will also rotate in the clockwise direction and at the same speed as the input shaft 16. Thus the planetary gear set acts as a solid coupling in the forward mode providing a 1:1 input to output speed ratio.

In the reverse mode, the brake band 24 is frictionally engaged to the planetary carrier 20 while the engaging ring 76 is in the neutral position. Once again considering the clockwise rotation of the input shaft 16 for illustrative purposes, it can be seen that clockwise rotation of the input shaft 16 will cause counter clockwise rotation of the output shaft 18. As always, the sun gear 26 rotates with the input shaft 16, but the input shaft 16 is free to rotate relative to the planetary carrier 20 because the engaging ring 76 is disengaged from the teeth 98 and 96. The brake band 24 is frictionally engaged to the planetary carrier 20 and therefore holds the planetary carrier 20 motionless relative to the housing 14. as the sun gear 26 spins in the clockwise direction, the pins 50 will remain stationary and the planetary gears 28 will rotate in the counter clockwise direction. The teeth 56 of the planetary gears 28 being in mesh with the internal grooves 62 of the ring gear 30, counter clockwise rotation of the planetary gears 28 will cause counter clockwise rotation of the output shaft 18 thus reversing the direction of rotation. The speed at which the ring gear 30 and consequently the output shaft 18 rotate, is a function of the internal diameter of the ring gear 30 and the diameter of the sun gear 26. More specifically, the ratio of the rotational speed of the input shaft 16 to that of the output shaft 18 will be about the same as the ratio of the internal diameter of the ring gear 30 to the diameter of the sun gear 26. Therefore, the rotational speed of the output shaft 18 will be slower than the rotational speed of the input shaft 16 in reverse mode because the internal diameter of the ring gear 30 is greater than the diameter of the sun gear 26. Within this limitation, the rotational speed of the output shaft 18 relative to the rotational speed of the input shaft 16, in reverse mode, can be selected by selecting the appropriate internal diameter for the ring gear 30 and the appropriate diameter for the sun-gear 26.

FIG. 2 shows a cross-sectional view of the support housing 14 of the transmission 10 showing the means 12 for applying more evenly distributed braking forces to a rotating element and the actuating mechanism 70 for engaging the brake band 24. The brake band 24 has a first end 66 and a second end 68. The first end 66 is spaced apart from the second end 68 and except for the gap between the first and second ends 66 and 68, the brake band 24 substantially encircles the outer surface 64 of the planetary carrier 20. The first and second ends 66 and 68 have projections 104 and 106, respectively. The projections 104 and 106 form the interface between the brake band 24 and the actuating mechanism 70 which acts to bring the projections 104 and 106 together. In the example illustrated in FIG. 2, the actuating mechanism 70 is based on bicycle brake cable principle and includes a steel cable 108 which has a cable cover 110. Each of the projections 104 and 106 has a hole which is just big enough for the cable 108 to pass through but too small for the cable cover 110 to pass through. The end of the cable 108 passing through the projection 106 has a stop 112 fixed thereto such that the cable 108 cannot be pulled back through the holes in the projections 106 and 104. The stop 112 can be a spherical or cylindrical mass soldered, screwed, riveted or otherwise fixed to the end of the cable 110. The cable cover 110 is resistant to axial compression in the manner of a bicycle brake cable cover. One end of the cable cover 110 abuts the projection 104, and the other end of the cable cover is fixedly held relative to a pivoting lever (not shown) similar to a bicycle brake for example. When the cable 108 is pulled relative to the cable cover 110 such that the stop 112 is pulled toward the end of the cable cover 110 abutting the projection 104, the projections 104 and 106 are brought together frictionally engaging the brake band 24 to the planetary carrier 20. A spring 114 pushes the projections 104 and 106 apart when the cable 108 is released, and springs 116 and 118 return the brake band 24 back to its initial position, relative to the support housing 14, after the cable 108 is released. It is important to note that the actuating mechanism 70 as shown in the accompanying drawing figures is intended as an illustrative example only and does not limit the scope of the present invention. Any other well known mechanism suitable for bringing the ends 66 and 68 of the brake band 24 together, including but not limited to push rods or pins, hydraulic plungers, hydraulic calipers, pneumatic calipers, and mechanical calipers, may be used in place of the actuating mechanism 70 illustrated in the attached drawings.

In general, the means for applying more evenly distributed braking forces to a rotating element, forms part of a brake system for stopping rotation of a rotary element. The brake system according to the present invention also includes an outer element encircling the rotary element that is to be stopped and actuating means for selectively frictionally engaging a brake band to the rotating or rotary element in those embodiments that employ a brake band.

In the embodiment of FIGS. 1 and 2, the rotary element is the planetary carrier 20, the outer element is the support housing 14, the brake band is the brake band 24, and the actuating means for selectively applying the brake band is the actuating mechanism 70. In addition to the brake band 24, the means 12 for applying more evenly distributed braking forces to a rotary element includes a plurality of lugs 120 projecting from the outer surface of the brake band 24 and a plurality of lug receiving concavities 122 which are formed in the wall of the support housing 14. The lugs 120 are integral with the brake band 24, and the concavities 122 are created by depressions in the inner surface 124 of the support housing 14. Also, the concavities 122 open to the interior of the support housing 14.

Each of the lugs 120 is received in a respective one of the concavities 122. When viewed in cross section with the line of sight parallel to the axis of rotation of the planetary carrier 20 each projection 120 is symmetrical about a midline which is about coincident with a radius of the planetary carrier 20. Again when viewed in cross section with the plane of the section being perpendicular to the axis of rotation of the planetary carrier 20, each lug 120 is widest at its base and uniformly decreases in width with increasing radial distance from the axis of rotation of the planetary carrier 20, such that a ramp surface 126 is formed on either side of each lug 120. The slope of each ramp surface 126 can be constant or variable as long as at each point along the ramp surface the slope or tangent of the ramp surface makes an acute angle with a line perpendicular to the midline of the lug 120 and about coincident with the base of the lug 120.

When viewed in cross section, each concavity 122 is also symmetric about its midline, the midline being about coincident with a radius of the support housing 14. As seen in FIG. 2, each concavity 122 is widest at its opening on the inner surface 124 of the support housing 14. Each concavity 122 decreases in width with increasing depth such that a ramp surface 128 is formed on either side of each concavity 122. The slope of each ramp surface 128 can be constant or variable as long as at each point along the ramp surface the slope or tangent of the ramp surface 128 makes an acute angle with a line perpendicular to the midline of the concavity 122 and about coincident with a chord extending across the opening of the concavity 122. Thus, the contour of each concavity 122 parallels the contour of each lug 120, as seen in FIG. 2. There is not sufficient clearance between the inner surface 124 and the outer surface 64 of the planetary carrier 20 to allow the lugs 120 to fit therebetween.

The inner surface 124 of the support housing 14 encircles the outer surface 64 of the planetary carrier 20. The inner surface 124 of the support housing 14 is spaced apart from the outer surface 64 of the planetary carrier 20. The brake band 24 is positioned intermediate the inner surface 124 of the support housing 14 and the outer surface 64 of the planetary carrier 20. The inner surface of the brake band 24 faces the outer surface 64 of the planetary carrier 20, while the outer surface of the brake band 24 faces the inner surface 124 of the support housing 14.

When the actuating means 70 acts to bring the ends 66 and 68 of the brake band 24 together, the brake band 24 will frictionally engage the outer surface 64 of the planetary carrier 20. With the brake band 24 gripping the planetary carrier 20, the brake band 24 will begin to rotate with the planetary carrier 20. Any rotation of the brake band 24 away from its initial disengaged position shown in FIG. 2 will bring one of the ramp surfaces 126 of each of the lugs 120 into contact with a respective one of the ramp surfaces 128 of a respective concavity 122.

As the lugs 120 meet the ramp surfaces 128, the lugs 120 and consequently the brake band 24 are more forcefully pressed against the outer surface 64 of the planetary carrier 20 as the lugs 120 are wedged between the ramp surfaces 128 and the outer surface 64 of the planetary carrier 20. Thus the lugs 120 in cooperation with the concavities 122 amplify the frictional force provided by the actuating mechanism 70 and ultimately cause sufficient frictional force to be generated until the planetary carrier is brought to a complete halt and held motionless. Because of the slope of the ramp surfaces 128, the force applied to the lugs 120 has a component normal to the outer surface 64 of the planetary carrier 20, thus allowing the lugs 120 to increase the frictional force applied to the outer surface 64 of the planetary carrier 20.

The means for applying more evenly distributed braking forces to a rotary element, as shown in FIG. 2, is omnidirectional. In other words, the means for applying more evenly distributed braking forces shown in FIG. 2 can stop the rotation of a rotary element regardless of whether the rotary element is rotating in the clockwise direction or the counter clockwise direction. This omnidirectional property is due to the symmetrical shape of the lugs 120 and the concavities 122. When the cable 108 is released, the spring 114 restores the gap between the ends 66 and 68 to its initial size while the springs 116 and 118 act to restore the brake band 24 to its initial disengaged position. With the brake band 24 in its initial disengaged position, the planetary carrier is free to rotate once again. The brake band 24 is preferably metallic.

Figure 3:
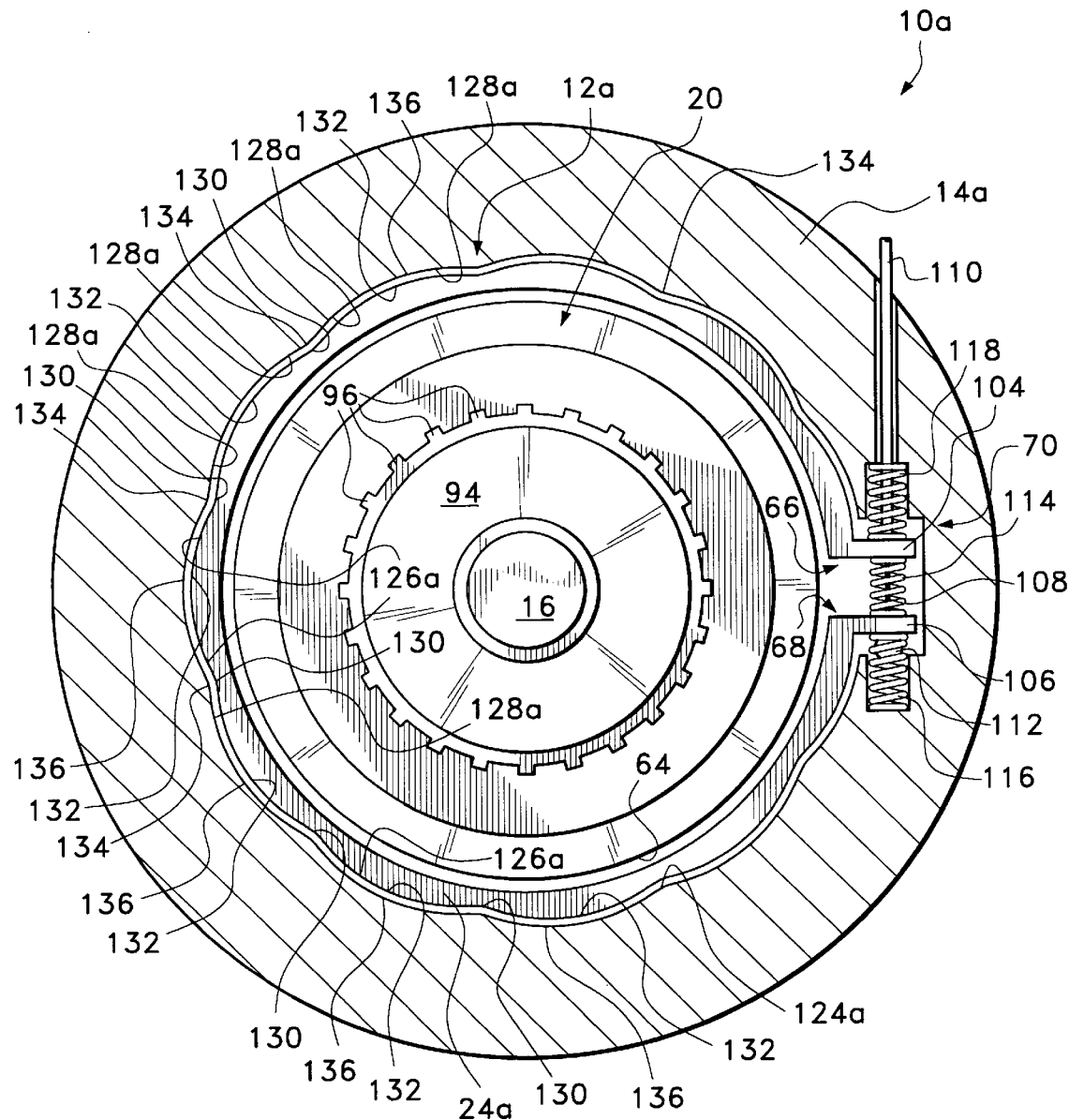
FIG. 3 is a cross sectional view of a hybrid transmission using a band brake with variable thickness according to the present invention.

Referring to FIG. 3, an alternative embodiment 10a of the hybrid transmission according to the invention can be seen. The only difference between the embodiments 10 and 10a lies in the means used to apply more evenly distributed braking forces to the planetary carrier. The means 12a for applying more evenly distributed braking forces to a rotating element includes a brake band 24a which has a variable thickness and an inner surface 124a of a support housing 14a which parallels the outer surface of the brake band 24a.

The brake band 24a has a variable thickness such that the radial thickness of the brake band 24a varies along the inner circumference of the brake band 24a from a maximum thickness to a minimum thickness and again back to a maximum thickness. This pattern of thickness variation is repeated along the entire length of the brake band 24a extending between the ends 66 and 68. The outer surface of the brake band 24a, extending from a point of minimum thickness 130 toward a point of maximum thickness 132, is sloping relative to a line extending between adjacent points of minimum thickness 130 so as to form a ramp surface 126a.

Viewed in cross section, the inner surface 124a of the support housing 14a has a contour that parallels the contour of the outer surface of the brake band 24a. The inner surface 124a of the support housing 14a has variable depth in the radial direction relative to the axis of rotation of the planetary carrier 20. The radial depth of the inner surface 124a of the support housing 14a varies from a point of minimum depth 134 to a point of maximum depth 136. There is not sufficient clearance between the point of minimum depth 134 and the outer surface 64 of the planetary carrier 20 to allow the portion of the brake band 24a having the maximum thickness to pass therethrough. The inner surface 124a of the housing 14a, extending from a point of minimum depth 134 toward a point of maximum depth 136, is sloping relative to a line extending between adjacent points of minimum depth 134 so as to form a ramp surface 128a.

The inner surface 124a of the support housing 14a encircles the outer surface 64 of the planetary carrier 20. The inner surface 124a of the support housing 14a is spaced apart from the outer surface 64 of the planetary carrier 20. The brake band 24a is positioned intermediate the inner surface 124a of the support housing 14a and the outer surface 64 of the planetary carrier 20. The inner surface of the brake band 24a faces the outer surface 64 of the planetary carrier 20, while the outer surface of the brake band 24a faces the inner surface 124a of the support housing 14a.

When the actuating means 70 acts to bring the ends 66 and 68 of the brake band 24a together, the brake band 24a will frictionally engage the outer surface 64 of the planetary carrier 20. With the brake band 24a gripping the planetary carrier 20, the brake band 24a will begin to rotate with the planetary carrier 20. Any rotation of the brake band 24a away from its initial disengaged position shown in FIG. 3 will bring one of the two ramp surfaces 126a adjacent each of the points of maximum thickness 132 into contact with a respective one of the ramp surfaces 128a.

As the ramp surfaces 126a meet the ramp surfaces 128a, the brake band 24a is more forcefully pressed against the outer surface 64 of the planetary carrier 20 as the portions of the brake band 24a intermediate neighboring points of minimum thickness 130 are wedged between the ramp surfaces 128a and the outer surface 64 of the planetary carrier 20. Thus the variable thickness profile of the brake band 24a in cooperation with the inner surface 124a of the support housing 14a amplify the frictional force provided by the actuating mechanism 70 and ultimately cause sufficient frictional force to be generated until the planetary carrier is brought to a complete halt and held motionless. Because of the slope of the ramp surfaces 128a, the force applied to the brake band 24a has a component normal to the outer surface 64 of the planetary carrier 20, thus causing an increase in the frictional force between the brake band 24a and the outer surface 64 of the planetary carrier 20.

The means for applying more evenly distributed braking forces to a rotary element, as shown in FIG. 3, is omnidirectional. In other words, the means for applying more evenly distributed braking forces shown in FIG. 3 can stop the rotation of a rotary element regardless of whether the rotary element is rotating in the clockwise direction or the counter clockwise direction. This omnidirectional property is due to the symmetrical shape of the portion of the brake band 24a intermediate each adjacent pair of points of minimum thickness 130. When the cable 108 is released, the spring 114 restores the gap between the ends 66 and 68 to its initial size while the springs 116 and 118 act to restore the brake band 24a to its initial disengaged position. With the brake band 24a in its initial disengaged position, the planetary carrier 20 is free to rotate once again.

Figure 4:
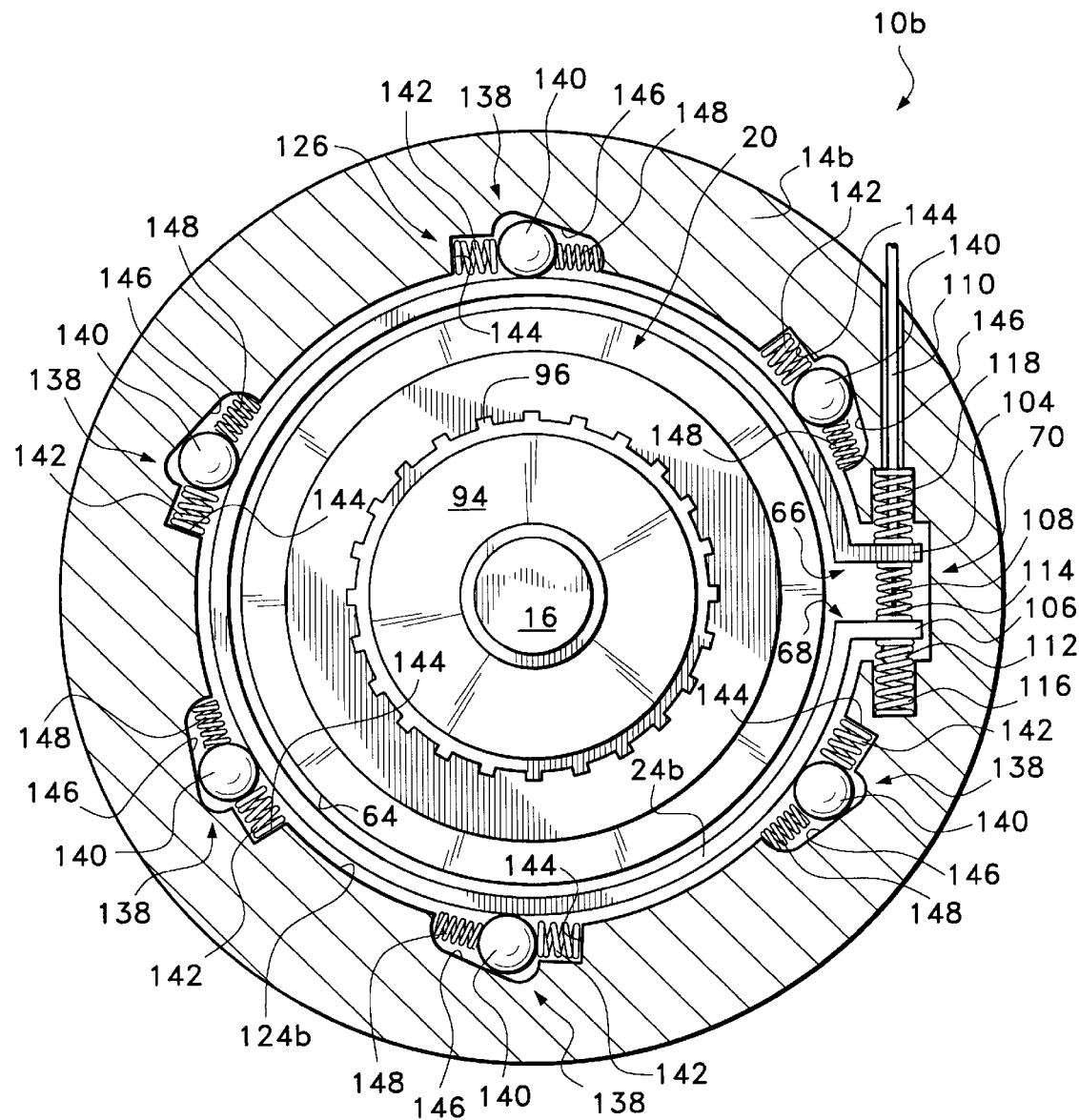
FIG. 4 is a cross sectional view of a hybrid transmission using ball bearings to amplify the force applied by the band brake actuating mechanism according to the present invention.

Referring to FIG. 4, a third embodiment 10b of the hybrid transmission according to the invention can be seen. The only difference between the embodiments 10 and 10b lies in the means used to apply more evenly distributed braking forces to the planetary carrier 20. The means 12b for applying more evenly distributed braking forces to a rotating element includes a brake band 24b which has a uniform thickness, ramped cavities 138, ball or roller bearings 140, and engaging springs 142.

The brake band 24b is a metallic band of uniform thickness and may have a lining of a material suitable as a brake lining. Such materials are well known in the art and will not be discussed here in any detail. The inner surface 124b of the support housing 14b encircles the outer surface 64 of the planetary carrier 20. The inner surface 124b of the support housing 14b is spaced apart from the outer surface 64 of the planetary carrier 20. The brake band 24b is positioned intermediate the inner surface 124b of the support housing 14b and the outer surface 64 of the planetary carrier 20. The inner surface of the brake band 24b faces the outer surface 64 of the planetary carrier 20, while the outer surface of the brake band 24b faces the inner surface 124b of the support housing 14b.

Viewed in cross section, a plurality of ramped cavities 138 are distributed around the inner surface 124b of the support housing 14b. The cavities 138 are open to the interior of the housing 14b. The cavities 138 have a spring housing portion 144 and a ramped portion 146. The ramped portion 146 of each cavity 138 houses a ball or roller bearing 140, while the spring housing portion 144 of each cavity 138 houses an engaging spring 142. The ramped portion 146 of each cavity 138 has a maximum depth proximate the spring housing portion 144, and the depth of the ramped portion 146 decreases smoothly and monotonically to a minimum distal from the spring housing portion 144. Each of the springs 142 extends into the ramped portion 146 of its respective cavity 138 and biases the ball or roller bearing 140 toward the shallow end of each respective ramped cavity portion 146.

When the actuating means 70 acts to bring the ends 66 and 68 of the brake band 24b together, the brake band 24b will frictionally engage the outer surface 64 of the planetary carrier 20. With the brake band 24b gripping the planetary carrier 20, the brake band 24b will begin to rotate with the planetary carrier 20. Assume that initially the planetary carrier 20 is rotating in a direction such that the deep end of the ramped portion 146 of each cavity 138 is encountered ahead of the shallow end of the ramped portion 146 in the direction of rotation of the planetary carrier 20. In other words, the planetary carrier 20 is rotating in the same direction as the direction in which the balls or rollers 140 are biased by the springs 142. In the example illustrated in FIG. 3, this direction would be clockwise. Any clockwise rotation of the brake band 24b away from its initial disengaged position shown in FIG. 4 will move the ball or roller bearings 140 toward the shallow end of the ramp portion 146 of each cavity 138, with the result that each ball or roller bearing 140 is wedged between the ramp surface extending from the deep end to the shallow end of the ramp portion 146 of its respective cavity 138 and the outer surface of the brake band 24b. Consequently, the brake band 24b is more forcefully pressed against the outer surface 64 of the planetary carrier 20. Thus the ball or roller bearings 140 in cooperation with the ramp portions 146 of the cavities 138 amplify the frictional force provided by the actuating mechanism 70 and ultimately cause sufficient frictional force to be generated until the planetary carrier is brought to a complete halt and held motionless. Because of the slope of the ramp surfaces extending from the deep end to the shallow end of the ramp portion 146 of each cavity 138, the force applied to the brake band 24b has a component normal to the outer surface 64 of the planetary carrier 20, thus causing an increase in the frictional force between the brake band 24b and the outer surface 64 of the planetary carrier 20.

The means for applying more evenly distributed braking forces to a rotary element, as shown in FIG. 4, is unidirectional. In other words, the means for applying more evenly distributed braking forces shown in FIG. 4 is only effective in amplifying the frictional force between the brake band 24b and the planetary carrier 20 when the planetary carrier 20 is rotating in the direction in which the depth of the ramp portions 146 of the cavities 138 is decreasing. When the cable 108 is released, the spring 114 restores the gap between the ends 66 and 68 to its initial size while the springs 116 and 118 act to restore the brake band 24b to its initial disengaged position. As the spring 116 in particular restores the brake band 24b to its initial position, the counter clockwise rotation of the brake band 24b causes the ball or roller bearings 140 to roll toward the deep end of their respective ramped cavity portions 146. As the ball or roller bearings 140 roll toward the deep end of their respective ramped cavity portions 146, sufficient clearance is created for the brake band 24b to disengage from the outer surface 64 of the planetary carrier 20. With the brake band 24b in its initial disengaged position, the planetary carrier 20 is free to rotate once again. Optional disengaging springs 148 can be provided intermediate the balls or rollers 140 and the shallow end of their respective ramped cavity portions 146 to aid in dislodging the balls or rollers from their wedged positions once the actuating mechanism 70 has released the ends 66 and 68 of the brake band 24b. The disengaging springs 148 bias the ball or roller bearings 140 toward the deep end of the ramped cavity portions 146.

Figure 5:
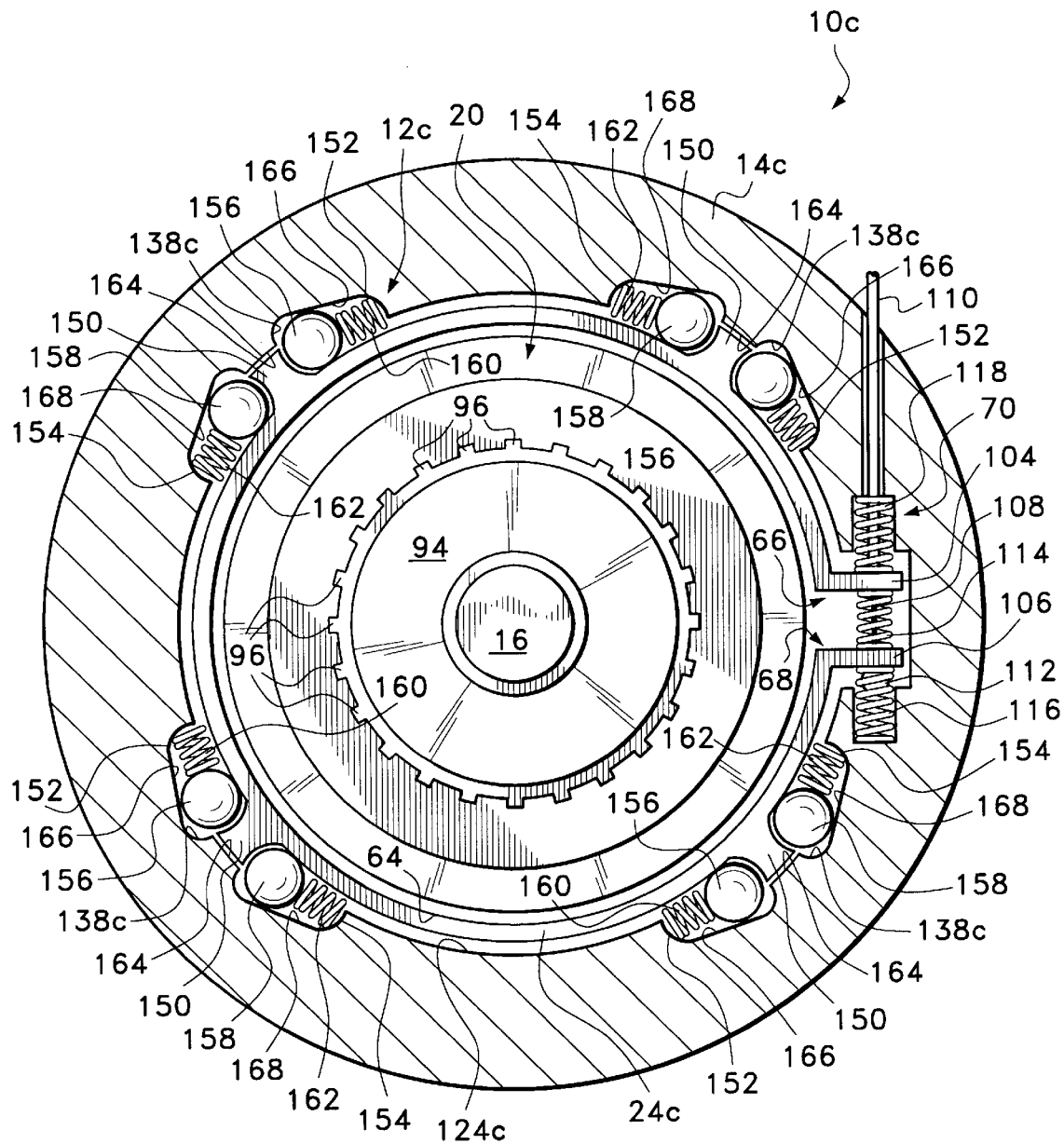
FIG. 5 is a cross sectional view of a hybrid transmission using pairs of mirror-image ball bearings to amplify the force applied by the band brake actuating mechanism according to the present invention.

Referring to FIG. 5, a fourth embodiment 10c of the hybrid transmission according to the invention can be seen. The only difference between the embodiments 10 and 10c lies in the means used to apply more evenly distributed braking forces to the planetary carrier 20. The means 12c for applying more evenly distributed braking forces to a rotating element includes a brake band 24c which has a plurality of lugs 150 projecting from the outer surface thereof, a plurality of cavities 138c each having a pair of mirror image ramped portions 152 and 154, a pair of ball or roller bearings 156 and 158 provided in each of the cavities 138c, and pairs of disengaging springs 160 and 162 provided in each of the cavities 138c.

The brake band 24c is metallic as before. The inner surface 124c of the support housing 14c encircles the outer surface 64 of the planetary carrier 20. The inner surface 124c of the support housing 14c is spaced apart from the outer surface 64 of the planetary carrier 20. The brake band 24c is positioned intermediate the inner surface 124c of the support housing 14c and the outer surface 64 of the planetary carrier 20. The inner surface of the brake band 24c faces the outer surface 64 of the planetary carrier 20, while the outer surface of the brake band 24c faces the inner surface 124c of the support housing 14c.

Viewed in cross section, a plurality of cavities 138c, each having a pair of mirror image ramped portions 152 and 154, are distributed around the inner surface 124c of the support housing 14c. The cavities 138c are open to the interior of the housing 14c. The cavities 138c each have two ramped portions 152 and 154 that are mirror images of one another. The ramped portions 152 and 154 have a maximum depth proximate the middle portion 164 of the cavities 138c, and the ramped portions 152 and 154 have a minimum depth at their ends located distal from the middle portion 164. The depth of the ramped portions 152 decreases in the clockwise direction forming the sloped ramp surfaces 166. The depth of the ramped portions 154 decreases in the counter clockwise direction forming the sloped ramp surfaces 168.

The lugs 150 project from the outer surface of the brake band 24c and are fixed thereto, however, the lugs 150 should not project far enough from the outer surface of the brake band 24c so as to collide with the ramp surfaces 166 and 168 when the lugs 150 are at the extreme of their displacement from the middle portions 164. The middle portion 164 of each cavity 138c need only be deep enough to house the respective lug 150 when the brake band 24c is in the initial disengaged position, therefore, the middle portion 164 will be shallower than the maximum depth of the ramped portions 152 and 154 of the cavities 138c.

A ball or roller bearing 156 is housed in each of the ramped portions 152, intermediate the respective lug 150 and the end of the ramped portion 152 located distally from the middle portion 164. A ball or roller bearing 158 is housed in each of the ramped portions 154, intermediate the respective lug 150 and the end of the ramped portion 154 located distally from the middle portion 164. A disengaging spring 160 is provided in each of the ramped portions 152, intermediate the respective ball or roller bearing 156 and the end of the ramped portion 152 located distally from the middle portion 164. Similarly, A disengaging spring 162 is provided in each of the ramped portions 154, intermediate the respective ball or roller bearing 158 and the end of the ramped portion 154 located distally from the middle portion 164. Each pair of springs 160 and 162 cooperatively bias the lugs 150 and the ball or roller bearings 156 and 158 toward the initial disengaged position.

When the actuating means 70 acts to bring the ends 66 and 68 of the brake band 24c together, the brake band 24c will frictionally engage the outer surface 64 of the planetary carrier 20. With the brake band 24c gripping the planetary carrier 20, the brake band 24c will begin to rotate with the planetary carrier 20. If the planetary carrier 20 is initially rotating in a clockwise direction, the lugs 150 move the ball or roller bearings 156 away from the middle portion 164 toward the shallow end of the ramped portion 152 of each cavity 138c, with the result that each ball or roller bearing 156 is wedged between the ramp surface 166 and the outer surface of the brake band 24c. Consequently, the brake band 24c is more forcefully pressed against the outer surface 64 of the planetary carrier 20. Thus the ball or roller bearings 156 in cooperation with the ramp portions 152 of the cavities 138c amplify the frictional force provided by the actuating mechanism 70 and ultimately cause sufficient frictional force to be generated until the planetary carrier 20 is brought to a complete halt and held motionless. Similarly, If the planetary carrier 20 is initially rotating in a counter clockwise direction, the lugs 150 move the ball or roller bearings 158 away from the middle portion 164 toward the shallow end of the ramped portion 154 of each cavity 138c, with the result that each ball or roller bearing 158 is wedged between the ramp surface 168 and the outer surface of the brake band 24c. Consequently, the brake band 24c is more forcefully pressed against the outer surface 64 of the planetary carrier 20. Thus the ball or roller bearings 158 in cooperation with the ramp portions 154 of the cavities 138c amplify the frictional force provided by the actuating mechanism 70 and ultimately cause sufficient frictional force to be generated until the planetary carrier 20 is brought to a complete halt and held motionless.

Because of the slope of the ramp surfaces 166 and 168 the force applied to the brake band 24c by the ball or roller bearings 156 and 158 has a component normal to the outer surface 64 of the planetary carrier 20, thus causing an increase in the frictional force between the brake band 24c and the outer surface 64 of the planetary carrier 20.

The means for applying more evenly distributed braking forces to a rotary element, as shown in FIG. 4, is omnidirectional. In other words, the means for applying more evenly distributed braking forces shown in FIG. 5 is effective in amplifying the frictional force between the brake band 24c and the planetary carrier 20 regardless of the direction of rotation of the planetary carrier 20. When the cable 108 is released, the spring 114 restores the gap between the ends 66 and 68 to its initial size while the springs 116 and 118 act to restore the brake band 24c to its initial disengaged position. The rotation of the brake band 24c back to its disengaged position causes one of the ball or roller bearings 156 and 158, depending upon the initial direction of rotation of the planetary carrier 20, to roll toward the deep end of its respective ramped cavity portions 152 or 154. As the ball or roller bearings 156 or 158 roll toward the deep end of their respective ramped cavity portions 152 or 154, sufficient clearance is created for the brake band 24c to disengage from the outer surface 64 of the planetary carrier 20. With the brake band 24c in its initial disengaged position, the planetary carrier 20 is free to rotate once again. Disengaging springs 160 and 162 aid the process of restoring the ball or roller bearings 156 and 158, respectively, to their disengaged positions. The disengaging springs 160 and 162 bias the ball or roller bearings 156 and 158, respectively, toward the deep end of the ramped cavity portions 152 and 154.

Figure 6:
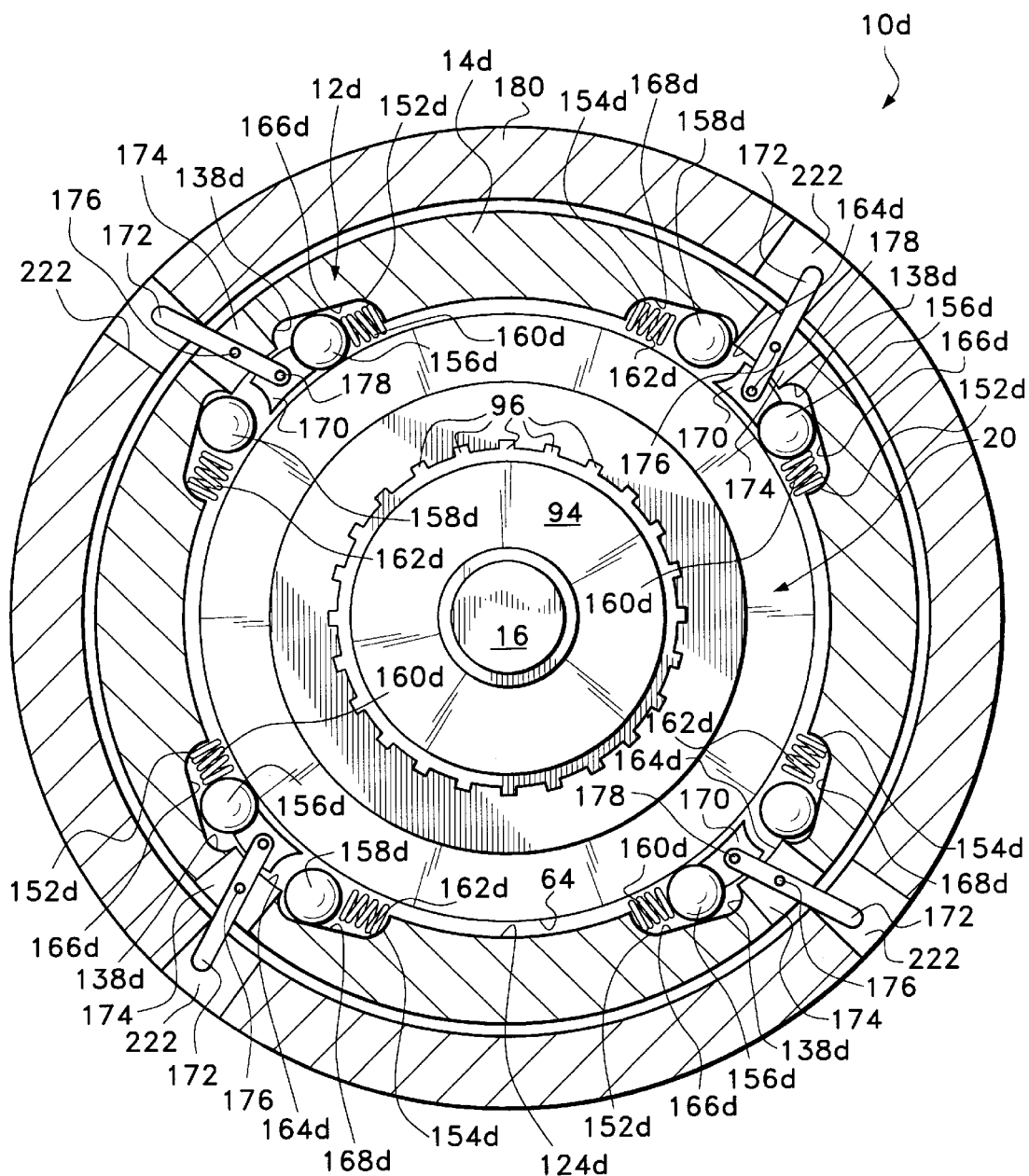
FIG. 6 is a cross sectional view of a hybrid transmission using pairs of mirror-image ball bearings which are selectively movable to apply braking force to a rotating element to thereby stop the rotation of the rotating element in either direction.
Figure 7:
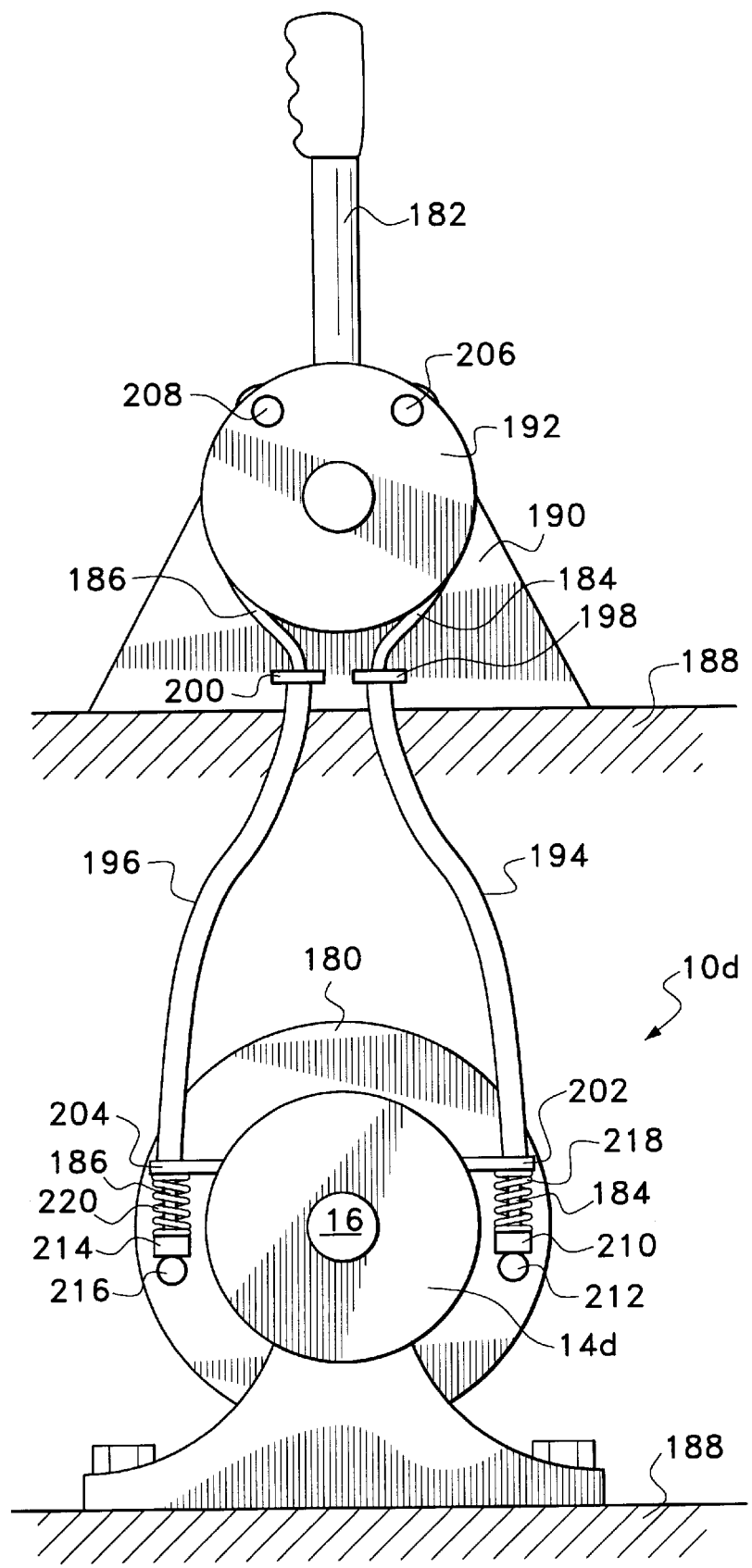
FIG. 7 is a schematic diagram of an example of an actuating mechanism which can selectively move the pairs of mirror-image roller or ball bearings to apply braking force to a rotating element.

Referring to FIGS. 6 and 7, a fifth embodiment 10d of the hybrid transmission according to the present invention can be seen. The main difference between the embodiments 10 and 10d lies in the means used to apply more evenly distributed braking forces to the planetary carrier 20. The means 12d for applying more evenly distributed braking forces to a rotating element includes a plurality of cavities 138d each having a pair of mirror image ramped portions 152d and 154d, a pair of ball or roller bearings 156d and 158d provided in each of the cavities 138d, a plurality of control shoes 170 for selectively moving the ball or roller bearings 156d and 158d, a plurality of control levers 172 each moving a respective control shoe 170, and pairs of disengaging springs 160d and 162d provided in each of the cavities 138d.

The transmission 10d lacks a brake band, therefore, the actuating mechanism 70 is absent from the transmission 10d. The inner surface 124d of the support housing 14d encircles the outer surface 64 of the planetary carrier 20. The inner surface 124d of the support housing 14d is spaced apart from the outer surface 64 of the planetary carrier 20 to allow free rotation of the planetary carrier 20.

Viewed in cross section, a plurality of cavities 138d, each having a pair of mirror image ramped portions 152d and 154d, are distributed around the inner surface 124d of the support housing 14d. The cavities 138d are open to the interior of the housing 14d. The cavities 138d each have two ramped portions 152d and 154d that are mirror images of one another. The ramped portions 152d and 154d have a maximum depth proximate the middle portion 164d of the cavities 138d, and the ramped portions 152d and 154d have a minimum depth at their ends located distal from the middle portion 164d. The depth of the ramped portions 152d decreases in the clockwise direction forming the sloped ramp surfaces 166d. The depth of the ramped portions 154d decreases in the counter clockwise direction forming the sloped ramp surfaces 168d.

The height of the control shoes 170 in the radial direction should not be great enough so as to cause the shoes 170 to collide with the ramp surfaces 166d and 168d when the shoes 170 are at the extreme of their displacement from the middle portions 164d. The middle portion 164d of each cavity 138d need only be deep enough to house the respective shoe 170 when the shoe 170 is in the initial disengaged position, therefore, the middle portion 164d will be shallower than the maximum depth of the ramped portions 152d and 154d of the cavities 138d.

A ball or roller bearing 156d is housed in each of the ramped portions 152d, intermediate the respective shoe 170 and the end of the ramped portion 152d located distally from the middle portion 164d. A ball or roller bearing 158d is housed in each of the ramped portions 154d, intermediate the respective shoe 170 and the end of the ramped portion 154d located distally from the middle portion 164d. A disengaging spring 160d is provided in each of the ramped portions 152d, intermediate the respective ball or roller bearing 156d and the end of the ramped portion 152d located distally from the middle portion 164d. Similarly, A disengaging spring 162d is provided in each of the ramped portions 154d, intermediate the respective ball or roller bearing 158d and the end of the ramped portion 154d located distally from the middle portion 164d. Each pair of springs 160d and 162d cooperatively bias the shoes 170 and the ball or roller bearings 156d and 158d toward the initial disengaged position.

The support housing 14d has a plurality of passages 174 which register with the middle cavity portions 164d and allow the middle cavity portions 164d to communicate with the exterior of the support housing 14d. Control levers 172 pass through the passages 174 and are pivotally secured within the respective passages 174 at the pivot points 176. An end portion of the each lever 172 is located outside the support housing 14d, while the opposite end of the control levers 172 are positioned within respective ones of the cavities 138d. The end of each control lever 172, positioned within a respective cavity 138d, is attached to a respective control shoe 170. The attachment 178 between each lever 172 and its respective shoe 170 must allow both for pivotal and slidable movement of the end of the lever 172 relative to the shoe 170. This type of attachment can be provided by, for example, a pivot pin passing through the end of the lever 172 and engaging a radial slot in the shoe 170. The reason such an arrangement is necessary is that because the end of the lever 172 moves along a circular arc as the lever 172 pivots, the attachment point 178 is radially displaced relative to the axis of rotation of the planetary carrier 20. Therefore, some allowance must be made for the radial displacement of the attachment 178 as the lever 172 pivots. This radial displacement can be provided for by, for example, a radially extending slot formed in each shoe 170. When the ends of the levers 172 located outside the support housing 14d are pivoted in the counter clockwise direction, the shoes 170 will be pushed into the ramped cavity portions 152d. When the ends of the levers 172 located outside the support housing 14d are pivoted in the clockwise direction, the shoes 170 will be pushed into the ramped cavity portions 154d.

The levers 172 can be made to pivot in unison or they can be controlled individually. FIGS. 6 and 7 show an illustrative example of a mechanical linkage or control means that can be used to cause the levers 172 to pivot in unison in either the clockwise or the counter clockwise direction under the control of a user. It should be kept in mind that the mechanical control means illustrated in FIGS. 6 and 7 is an illustrative example only and is not intended to limit the scope of the present invention. It is intended that the means for applying more evenly distributed braking forces to a rotary element, as depicted in FIGS. 6 and 7, be usable in conjunction with any suitable system for controlling the levers 172. Suitable systems for controlling the levers 172 may control the levers 172 individually or collectively, and such systems may be of any type including but not limited to mechanical, electrical, electronic, pneumatic, and hydraulic types.

The system for controlling the levers 172, as illustrated in FIGS. 6 and 7, includes a control ring 180, pivoting control lever 182, and control cables 184 and 186. The transmission 10d would ordinarily be fixed to a support 188, such as the ground, a boat, or a vehicle. Also the lever 182 is pivotally supported by a base 190 on the same support 188 (the depiction in FIG. 7 is schematic). A circular cam 192 is fixed relative to the lever 182 such that the cam 192 moves with the lever 182. The axis of rotation of the cam 192 passes through the center of the cam 192 and is coincident with the pivot axis of the lever 182. The cam 192 has a peripheral groove (not shown) running along substantially the entire length of the cam's perimeter. The peripheral groove of cam 192 is dimensioned to cradle the cross section of the cables 184 and 186.

The cables 184 and 186 have axially incompressible covers 194 and 196, respectively. The cables 184 and 186 along with their covers 194 and 196 operate in a manner similar to bicycle brake cables. The base 190 has a pair of projections 198 and 200 fixed thereto. The projections 198 and 200 have perforations that allow the cables 184 and 186, respectively, to pass therethrough, but the perforations are too narrow for the covers 194 and 196 to pass through. A pair of projections 202 and 204 are fixed to the support housing 14d. The projections 202 and 204 have perforations that allow the cables 184 and 186, respectively, to pass therethrough, but the perforations are too narrow for the covers 194 and 196 to pass through. Thus the ends of the cover 194 are confined between the projections 198 and 202, and the ends of the cover 196 are confined between the projections 200 and 204. After the cable 184 passes through the projection 198, the cable 184 is routed around the cam 192 such that the cable rests in the peripheral groove of the cam 192, and the end of the cable 184 that had been threaded through the projection 198 is fixed to the cam 192 by a pin 206 proximate the lever 182. Similarly, after the cable 186 passes through the projection 200, the cable 186 is routed around the cam 192, on the side of the cam opposite the side around which the cable 184 is routed, such that the cable 186 rests in the peripheral groove of the cam 192, and the end of the cable 186 that had been threaded through the projection 200 is fixed to the cam 192 by a pin 208 proximate the lever 182.

The end of the cable 184 distal from the cam 192 is threaded through the projection 202 and through a projection 210 which is fixed to the control ring 180. After passing through projection 210, a stop 212, similar to the stop 112, is fixed to the end of the cable 184. The stop 212 abuts the projection 210, and the stop 212 prevents the end of the cable 184 from being pulled through the projection 210. Similarly, the end of the cable 186 distal from the cam 192 is threaded through the projection 204 and through a projection 214 which is fixed to the control ring 180. After passing through projection 214, a stop 216, similar to the stop 112, is fixed to the end of the cable 186. The stop 216 abuts the projection 214, and the stop 214 prevents the end of the cable 186 from being pulled through the projection 214. A spring 218 is provided intermediate the projection 202 and the projection 210 with the spring 218 surrounding the portion of the cable 184 extending between the projection 202 and the projection 210. Also, a spring 220 is provided intermediate the projection 204 and the projection 214 with the spring 220 surrounding the portion of the cable 186 extending between the projection 204 and the projection 214.

The control ring 180 is rotatably supported by the housing 14d. Consider the lever 182 initially in the position shown in FIG. 7. If the lever 182 is pivoted by a user in the counter clockwise direction, more of cable 184 will be taken up around the cam 192 while an equal length of the cable 186 is paid out off of the cam 192. This action causes the stop 212 and consequently the projection 210 to be pulled closer to the projection 202, while allowing the stop 216 and the projection 214 to move away from the projection 204. Thus, counter clockwise pivoting of the lever 182 causes the counter clockwise rotation of the control ring 180 around the housing 14d. Similarly, clockwise pivoting of the lever 182 causes the clockwise rotation of the control ring 180 around the housing 14d. The springs 218 and 220 restore the lever 182 and the control ring 180 to the initial position shown in FIG. 7 when the lever 182 is released.

The control ring 180 has a plurality of cavities 222. The portion of each lever 172, located outside the housing 14d, is housed in a respective one of the cavities 222. In the initial position shown in FIG. 7, the walls of the cavities 222 do not impinge upon the levers 172, and the levers 172 are radially aligned with the axis of rotation of the input shaft 16 and the shoes 170 are centered within their respective cavities 138d. Thus, the initial position shown in FIG. 7 is also the disengaged position for the means for applying more evenly distributed braking forces 12d.

Counter clockwise rotation of the ring 180 will cause the walls of the cavities 222 to impinge upon the levers 172, causing the levers 172 to pivot in the counter clockwise direction about their pivot points 176. Counter clockwise pivoting of the levers 172 will cause the shoes 170 to push the ball or roller bearings 156d toward the shallow end of the ramped cavity portions 152d, thus wedging the ball or roller bearings 156d between the ramp surfaces 166d and the outer surface 64 of the planetary carrier 20. With the ball or roller bearings 156d in this position, the ball or roller bearings 156d apply a frictional force to the planetary carrier 20 and thus will bring the rotation of the planetary carrier 20 to a halt and will hold the planetary carrier 20 motionless.

Similarly, clockwise rotation of the ring 180 will cause the walls of the cavities 222 to impinge upon the levers 172, causing the levers 172 to pivot in the clockwise direction about their pivot points 176. Clockwise pivoting of the levers 172 will cause the shoes 170 to push the ball or roller bearings 158d toward the shallow end of the ramped cavity portions 154d, thus wedging the ball or roller bearings 158d between the ramp surfaces 168d and the outer surface 64 of the planetary carrier 20. With the ball or roller bearings 158d in this position, the ball or roller bearings 158d apply a frictional force to the planetary carrier 20 and thus will bring the rotation of the planetary carrier 20 to a halt and will hold the planetary carrier 20 motionless.

Therefore, pivoting of the lever 182 will cause one of the sets of ball or roller bearings 156d and 158d to frictionally engage the planetary carrier 20 and hold it motionless. Preferably, if the planetary carrier 20 is initially rotating in a clockwise direction, the lever 182 is pivoted in the counter clockwise direction to stop the rotation of the planetary carrier 20, and if the planetary carrier 20 is initially rotating in a counter clockwise direction, the lever 182 is pivoted in the clockwise direction to stop the rotation of the planetary carrier 20. Using this strategy, the depth of the ramped cavity portion acting to press the ball or roller bearings against the outer surface 64 of the planetary carrier 20 is always decreasing in the direction of rotation of the planetary carrier 20. Therefore, the rotation of the planetary carrier itself will force the balls or rollers into getting wedged between the ramp surfaces 166d or 168d and the outer surface 64 of the planetary carrier 20, and therefore, using the control strategy outlined above, the rotation of the planetary carrier itself will amplify the frictional force applied by the ball or roller bearings.

Because of the slope of the ramp surfaces 166d and 168d urging the ball or roller bearings toward the outer surface 64 of the planetary carrier 20, the force applied to the outer surface 64 of the planetary carrier 20 by the ball or roller bearings 156d and 158d has a component normal to the outer surface 64 of the planetary carrier 20. The frictional force between two surfaces being proportional to the normal component of force between those two surfaces, it can be seen that the means for applying more evenly distributed braking forces 12d generates frictional force by producing forces with components normal to the outer surface 64 of the planetary carrier 20. The disengaging springs 160d and 162d bias the ball or roller bearings 156d and 158d, respectively, toward the deep end of the ramped cavity portions 152d and 154d. Disengaging springs 160d and 162d aid the process of restoring the ball or roller bearings 156d and 158d, respectively, to their disengaged positions at the deep end of their respective ramped cavity portions 152d and 154d. When the lever 182 is released, the shoes 170 return to their disengaged positions and the springs 160d and 162d restore the ball or roller bearings to their disengaged positions allowing free rotation of the planetary carrier 20.

It is to be understood that the present invention is not limited to the embodiments described above, but encompasses any and all embodiments within the scope of the following claims.

I claim:

1. A brake system for stopping rotation of a rotary element, wherein the rotary element has an outer surface, the brake system comprising:

an outer element having an inner surface which encircles the outer surface of the rotary element, said inner surface of said outer element being spaced apart from the outer surface of the rotary element;

a brake band positioned intermediate said inner surface of said outer element and the outer surface of the rotary element, said brake band having an inner surface facing the outer surface of the rotary element and an outer surface facing said inner surface of said outer element;

actuating means for selectively frictionally engaging said brake band to the outer surface of the rotary element; and means for applying a force having a component normal to the outer surface of the rotary element to said outer surface of said brake band responsive to said brake band frictionally engaging the outer surface of the rotary element, whereby said means for applying a force causes additional braking force to be applied between said brake band and the rotary element in addition to a braking force exerted by said brake band on the rotary element due solely to said actuating means acting to frictionally engage said brake band to the outer surface of the rotary element.

2. The brake system according to claim 1, wherein said outer element has at least one lug receiving concavity which is open at said inner surface of said outer element and said lug receiving concavity having a wall, and wherein said means for applying a force includes:

a lug projecting from said outer surface of said brake band, said lug fitting into said lug receiving concavity, said lug contacting said wall of said lug receiving concavity and thus said lug being cammed toward the outer surface of the rotary element to thereby compress said brake band against the outer surface of the rotary element, when said actuating means frictionally engages said brake band to the outer surface of the rotary element, to thereby cause the additional braking force to be applied to the rotary element.

3. The brake system according to claim 2, wherein the rotary element has an axis of rotation, said lug has a midline which is directed approximately radially toward the axis of rotation of the rotary element, said lug is essentially symmetrical about said midline, said lug has a base where said lug meets said outer surface of said brake band, said lug is widest at said base thereof, and said lug has a surface which slopes up from said outer surface of said brake band to a predetermined height above said outer surface of said brake band on either side thereof.

4. The brake system according to claim 3, wherein said wall of said lug receiving concavity parallels said surface of said lug.

5. The brake system according to claim 1, wherein said outer element has a plurality of lug receiving concavities each of which is open at said inner surface of said outer element and each of said plurality of lug receiving concavities having a wall, and wherein said means for applying a force includes:

a plurality of lugs projecting from said outer surface of said brake band, each of said plurality of lugs fitting into a respective one of said plurality of lug receiving concavities, each of said plurality of lugs contacting said wall of said respective one of said plurality of lug receiving concavities and thus each said plurality of lugs being cammed toward the outer surface of the rotary element to thereby compress said brake band against the outer surface of the rotary element, when said actuating means frictionally engages said brake band to the outer surface of the rotary element, to thereby cause the additional braking force to be applied to the rotary element.

6. The brake system according to claim 5, wherein the rotary element has an axis of rotation, each of said plurality of lugs has a midline which is directed approximately radially toward the axis of rotation of the rotary element, each of said plurality of lugs is essentially symmetrical about said midline, each of said plurality of lugs has a base where each of said plurality of lugs meets said outer surface of said brake band, each of said plurality of lugs is widest at said base thereof, and each of said plurality of lugs has a surface which slopes up from said outer surface of said brake band to a predetermined height above said outer surface of said brake band on either side thereof.

7. The brake system according to claim 6, wherein said wall of each of said plurality of lug receiving concavities parallels said surface of a respective one of said plurality of lugs.

8. The brake system according to claim 1, wherein said brake band has a length and a variable thickness which varies between a minimum and a maximum in an undulating manner over said length of said brake band, said variable thickness imparting an undulating contour to said outer surface of said brake band, and said inner surface of said outer element paralleling said outer surface of said brake band, said inner surface of said outer element and said outer surface of said brake band cooperatively forming said means for applying a force.

9. The brake system according to claim 1, wherein said outer element has a plurality of cavities, each of said plurality of cavities having a spring housing portion and a ramped portion, said ramped portion decreasing in depth from proximate to said spring housing portion to an end of said ramped portion distal from said spring housing portion, and wherein said means for applying a force includes:

a plurality of bearings selected from the group consisting of ball and roller bearings, each of said plurality of bearings being housed in said ramped portion of a respective one of said plurality of cavities, each of said plurality of bearings frictionally engaging said outer surface of said brake band when each of said plurality of bearings moves toward said end of said ramped portion distal from said spring housing portion of a respective one of said plurality of cavities; and a plurality of springs each being housed in said spring housing portion of a respective one of said plurality of cavities, each of said plurality of springs biasing a respective one of said plurality of bearings toward said end of said ramped portion distal from said spring housing portion of a respective one of said plurality of cavities, whereby when said brake band is frictionally engaged to the rotary element, said plurality of bearings frictionally engage said outer surface of said brake band to thereby prevent rotary motion of the rotary element in a direction in which said depth of said ramped portion of each of said plurality of cavities decreases.

10. The brake system according to claim 1, wherein said outer element has a plurality of cavities, each of said plurality of cavities having a first ramped portion, a middle portion and a second ramped portion, said first ramped portion decreasing in depth from proximate to said middle portion in a first direction away from said middle portion, said second ramped portion decreasing in depth from proximate to said middle portion in a second direction away from said middle portion, said second direction being opposite to said first direction, and wherein said means for applying a force includes:

a first plurality of bearings selected from the group consisting of ball and roller bearings, each of said first plurality of bearings being housed in said first ramped portion of a respective one of said plurality of cavities, each of said first plurality of bearings frictionally engaging said outer surface of said brake band when each of said first plurality of bearings moves in said first direction;

a second plurality of bearings selected from the group consisting of ball and roller bearings, each of said second plurality of bearings being housed in said second ramped portion of a respective one of said plurality of cavities, each of said second plurality of bearings frictionally engaging said outer surface of said brake band when each of said second plurality of bearings moves in said second direction;

a first plurality of springs each being housed in said first ramped portion of a respective one of said plurality of cavities, each of said first plurality of springs biasing a respective one of said first plurality of bearings in said second direction;

a second plurality of springs each being housed in said second ramped portion of a respective one of said plurality of cavities, each of said second plurality of springs biasing a respective one of said second plurality of bearings in said first direction; and a plurality of lugs projecting from said outer surface of said brake band, each of said plurality of lugs fitting into said middle portion of a respective one of said plurality of cavities when said brake band is disengaged, whereby when said brake band is frictionally engaged to the rotary element, said plurality of lugs push one of said first and second pluralities of bearings into engagement with said outer surface of said brake band to thereby compress said brake band against the rotary element and generate the additional braking force applied between said brake band and the rotary element.

11. A brake system for stopping rotation of a rotary element, wherein the rotary element has an outer surface, the brake system comprising:

an outer element having an inner surface which encircles the outer surface of the rotary element, said inner surface of said outer element being spaced apart from the outer surface of the rotary element, said outer element having a plurality of cavities, each of said plurality of cavities having a first ramped portion, a middle portion and a second ramped portion, said first ramped portion decreasing in depth from proximate to said middle portion in a first direction away from said middle portion, said second ramped portion decreasing in depth from proximate to said middle portion in a second direction away from said middle portion, said second direction being opposite to said first direction;

a first plurality of bearings selected from the group consisting of ball and roller bearings, each of said first plurality of bearings being housed in said first ramped portion of a respective one of said plurality of cavities, each of said first plurality of bearings frictionally engaging the outer surface of the rotary element when each of said first plurality of bearings moves in said first direction;

a second plurality of bearings selected from the group consisting of ball and roller bearings, each of said second plurality of bearings being housed in said second ramped portion of a respective one of said plurality of cavities, each of said second plurality of bearings frictionally engaging the outer surface of the rotary element when each of said second plurality of bearings moves in said second direction;

a first plurality of springs each being housed in said first ramped portion of a respective one of said plurality of cavities, each of said first plurality of springs biasing a respective one of said first plurality of bearings in said second direction;

a second plurality of springs each being housed in said second ramped portion of a respective one of said plurality of cavities, each of said second plurality of springs biasing a respective one of said second plurality of bearings in said first direction;

a plurality of shoes each provided within a respective one of said plurality of cavities, each of said plurality of shoes being in a disengaged position when located in said middle portion of a respective one of said plurality of cavities, each of said plurality of shoes being slidably movable about its disengaged position; and a plurality of control levers pivotally supported by said outer element, each of said plurality of control levers engaging a respective one of said plurality of shoes, whereby when one of said plurality of control levers is caused to pivot, a respective one of said plurality of shoes is moved from its disengaged position to thereby push a respective one of said first and second pluralities of bearings into frictional engagement with the outer surface of the rotary element.

* * * * *